Patented Mar. 4, 1947

2,416,903

UNITED STATES PATENT OFFICE 2,416,903

METHOD OF HYDROGENATING COUMARONE-INDENE RESIN

William H. Carmody, deceased, late of Springfield, Ohio, by Marie O. Carmody, administratrix, Springfield, Ohio, assignor to Carmody Research Laboratories, Inc., Springfield, Ohio, a corporation of Ohio No Drawing. Application December 3, 1943, Serial No. 512,785

10 Claims. (Cl. 260—81)

This invention relates to the selective hydrogenation of indene and coumarone polymers. The application herein is a continuation-in-part of the application of William H. Carmody, Serial No. 280,128, filed June 20, 1939.

In the production of coumarone-indene resins by the polymerization of the resin-forming unsaturates coumarone and indene which occur in the crude solvent naphtha from coke oven light oil, in the coal-derived drip oils, and in the recycle oils from cyclization processes, the resultant polymers, representing all the different orders of polymerization, possess unsaturation of two sorts. One sort of unsaturation is in the benzene rings of the monomeric units which are linked to form the polymer, and the other sort of unsaturation occurs solely in the terminal unit of each of the polymers. In indene polymers unsaturation of the latter sort is in the cyclopentadiene structure of the final monomeric unit of the polymer. It is the premise, supported by experience, that the yellowing of coumarone and indene substances occurs by reaction at the terminal double bond or point of unsaturation of each of the polymers. This phenomenon of "yellowing" is a seriously disadvantageous property of the resins composed of the polymers of indene and of coumarone, and of mixtures of those polymers. For convenience the chemical mechanism by which yellowing occurs in coumarone and indene polymers is considered to be a fulvenation reaction in which there initially is a combination with oxygen accelerated by subjection to ultra-violet rays as in sunlight.

It has been the experience of the art that the initial purity of a coumarone-indene resin, by which is meant a resin composed of the polymers of indene or composed of the polymers of coumarone as well as a resin composed of mixtures of those polymers, takes place in spite of the greatest care which may be exercised to obtain a resin which initially is of high purity. Whereas the yellowing reaction which is termed fulvenation tends to occur during the progress of the condensation and polymerization reaction by which the polymers are formed to produce initially discolored or highly colored coumarone-indene resins, it occurs progressively in resins which by care exercised in their formation are initially of very light color. Taking a coumarone-indene resin which has been carefully prepared for maximum purity and which is initially thus of very light yellow coloration in a mass or lump, such resin is capable of producing a film which as initially deposited from solution is apparently colorless. This initially colorless film upon exposure to light and air will, however, rapidly and progressively darken until it has acquired a reddish brown or dark brown coloration.

It is the premise that this yellowing of coumarone and indene polymers occurs by aldehyde development in the terminal unit of the coumarone and indene polymers. Each such terminal unit, like the other units of the polymeric structure, has three double bonds in the benzene ring of the unit. Unlike the other units of the polymeric structure, however, it has an initial non-nuclear double bond lying outside the benzene ring or aromatic nucleus of the structure. Thus if we assume the formula for the indene monomer to be as follows:

*Formula A*

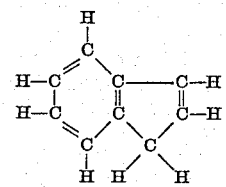

we have outside the benzene ring of the unit a point of unsaturation at which polymerization may take place. As I conceive the mechanism of polymerization by means of a catalyst, such for example as sulphuric acid, an addition product is first formed between indene monomers and the sulphuric acid, this action taking place in each monomer at the double bond outside the aromatic nucleus of the molecule. Subsequently two such addition products unite, splitting out the sulphuric acid catalyst but leaving a residual acid radical in the terminal unit of the dimer. Since the addition product is relatively unstable, this residual acid radical splits off to regenerate the double bond in the structure which it vacates. The same mechanism will occur in the case of trimers, tetramers and higher polymers comprising any given number of monomeric units, the double bond in the structure outside the aromatic nucleus in the terminal unit of the polymer being regenerated as a final incident to the polymerization. This leaves the terminal indene unit in the following condition:

*Formula B*

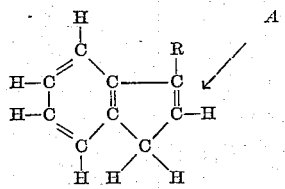

in which "R" represents the remainder of the polymeric structure comprising any given number of indene units. Similarly, the terminal unit of the coumarone polymer may be considered as having the following structure:

*Formula C*

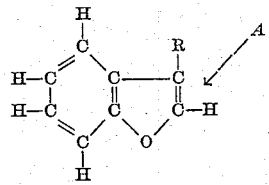

in which likewise "R" represents the remaining molecular structure of the polymer comprising any given number of coumarone units.

It may be taken as a fact that the polymerization of indene and of coumarone proceeds identically, although the tendency of the indene is to build up to polymers higher than those of the coumarone, that is to polymers comprising a greater number of monomeric units. Resins composed of a mixture of coumarone and indene polymers will, therefore, be taken herein as to mechanism of polymerization and discoloration, as also illustrative of resins formed of unmixed polymers of either coumarone or indene.

It is this double bond outside the aromatic nucleus in the terminal unit of the polymer which is susceptible to oxidation, and it is a hydrogen atom adjacent this double bond which reacts to form acids, aldehydes and ketones. Both hydrogen atoms adjacent the double bond in question (in the monomer) are easily replaced by organic radicals, complexes or residues either successively or simultaneously.

Since it will be understood that fulvenation, or discoloration, can be represented in terms of oxygen addition at this non-nuclear double bond of the terminal unit, it has been discovered that by blocking the possibility of oxygen combining with the terminal indene unit, the color development which has been termed fulvenation can be precluded. Theoretically this can be accomplished in any manner which effects a saturation of the double bond which is outside of the aromatic nucleus, this double bond being designated "A" in the simplified formulae given above. Saturation at this point blocks the entire line of reaction steps by which discoloration proceeds, and the polymer saturate at such point indefinitely will retain its initial color.

It has been the experience that hydrogenation so conducted as to saturate substantially all the polymers of a polymerized body of indene at this point in the terminal units of the polymers, while giving a resinous body protected against discoloration does not greatly increase the solubility of such body. Also as an observation confirmatory of the premise as to the point of attack in an indene polymer to produce discoloration, it has been observed that the lower indene polymers, such as the indene dimers, discolor more rapidly than do the higher indene polymers and ultimately attain a deeper coloration. Whereas, saturation with hydrogen at the point "A" in the terminal unit of the indene polymers results in producing polymers which are protected against discoloration, but the solubility of which is not substantially increased, a general attack upon the polymers by means of hydrogen has a different effect. Thus if indene polymers be indiscriminately hydrogenated with saturation of a substantial proportion of the double bonds in the aromatic nuclei of the polymers, the solubility of the polymers may be greatly increased by a quantitatively great introduction of hydrogen, but to the extent that the specified non-nuclear double bonds of the polymers have not been saturated by contact with hydrogen, the polymers retain their capacity for the "yellowing" reactions.

In the hydrogenation of coumarone-indene resin and other resins metal catalysts such as Raney nickel catalyst have been largely employed. Raney nickel is an extremely active hydrogenation catalyst for the polymers of coumarone-indene resin in all orders of polymerization, and its action renders the progress of hydrogenation extremely difficult to control when that catalyst is used. Even though it be desired to saturate with hydrogen only the non-nuclear double bond outside the benzene ring or aromatic nucleus in the terminal unit of the several polymers of the resin, the activity of the catalyst causes hydrogen in some measure promiscuously also to enter the double bonds throughout the polymers. Thus the hydrogenation of coumarone-indene polymers with Raney nickel catalyst tends to produce a resin which is of increased solubility, and also to produce a coumarone-indene resin which is of improved color stability by saturation of some of the non-nuclear double bonds outside the aromatic nuclei. In accordance with the above discussion, saturation of the double bonds in the aromatic nuclei has no effect in preventing color development in the polymers of the resin. This is true of all the coumarone-indene polymers from the dimers to those polymers containing a great number of the indene or coumarone units. In order, therefore, to obtain a coumarone-indene resin of good color stability by hydrogenation with Raney nickel catalyst it is necessary to hydrogenate under such conditions as to effect substantially complete hydrogenation of the several polymers of the resin throughout their chemical structure. Otherwise there is marked lack of color stability in the hydrogenated resins.

The present invention offers a full and satisfactory answer to the problem of producing non-yellowing or color-stable coumarone-indene resin, by a method economical in its consumption of hydrogen and moderate in its hydrogenating conditions. Recognizing that for some purposes it may be and is desired to introduce hydrogen partially or fully to saturate the double bonds in the aromatic nuclei of the resin polymers such is not within the compass of the present invention, nor does the accomplishment of that result of itself impart chemical stability and color stability to the resin.

It will readily be appreciated wherein the economy of the hydrogenation method resides in the light of the fact that the prevention of "yellowing" can be fully accomplished by hydrogen-saturating the two carbon atoms adjacent the non-nuclear double bond in the terminal unit of the resin polymers. As the size of the polymeric resin molecule increases, i. e., as the number of its monomeric units becomes greater, the percentage of hydrogen required to eliminate the non-nuclear double bond by saturation becomes proportionately less with respect to the molecular weight of the molecule. Thus with liquid coumarone-indene resins composed of coumarone and indene dimers and other low-melting coumarone-indene resins containing a relatively large proportion of dimers or other of the lower polymers, the quantity of hydrogen required for color stabilizing hydrogenation is much greater proportionately than with a resin composed wholly or chiefly of polymers formed of a relatively great number of monomeric units. Whereas the economy of the method in consumption of hydrogen is, therefore, most striking in the higher molecular weight and higher melting coumarone-indene resins, it is also economical in the case of all polymers down to and including the coumarone and indene dimers. Regardless of the polymer size the effect in color-stabilization is positive.

In conducting the method of the invention I employ a catalyst of a specially selected group the members of which are not simple metals and which are characterized by a high degree of selectivity in that by their use the lone double bond in the terminal units of the resin polymers can be fully hydrogenated throughout a body of the polymers, without materially hydrogenating the aromatic nucleus or benzene ring of that unit or of the other monomeric units of the polymer. This group of catalysts comprises the several metal chromites, copper chromite, iron chromite and nickel chromite, and of them copper chromite is preferred. This catalyst group is not susceptible of generic classification by class or group in the periodic system of the metals comprised in the chromites. In the sense of the invention the communal property of these specific metals resides in the ability to form chromites useful as selective hydrogenation catalysts.

Copper chromite, the most active of the chromite catalysts, is not as energetic in its catalytic effect as metallic nickel, and as noted seems to be selective in its action, first causing attack by hydrogen only at the above-mentioned non-nuclear terminal double bond of the coumarone and indene polymers.

This may be proved by subjecting benzene to a hydrogenation treatment with chromite catalyst. Thus there was placed 100 cc. of an approximately pure benzene fraction, consisting in substantial entirety of simple monomeric benzene ring structures, in a hydrogenation bomb with 6 grams of copper chromite, the bomb was closed, and hydrogen was run in under pressure. The maximum temperature was 100° C., and the initial pressure was 1000 pounds per square inch. The final pressure was 1000 pounds per square inch, showing that no hydrogen was consumed either by the benzene rings or by the catalyst. The addition of indene to benzene, and similar aromatic solvent substances presenting no point of unsaturation exterior to the benzene ring, under identical hydrogenating conditions resulted in a consumption of hydrogen very close to that theoretically required to saturate the two carbon atoms, giving the single point of unsaturation in the non-nuclear structure of the indene.

Experiment has shown that the amount of chromite catalyst should preferably be approximately 5% to 15% the weight of the resin. Although this proportion is approximately that used in the case of Raney nickel catalyst, the chromite catalyst presents a distinctive advantage because of its lower cost as compared to Raney nickel, and because of the fact that it is less susceptible to catalyst poison, and that no special precautions are required in connection with its preparation, storage or use. Experiment has also shown that 5 grams of copper chromite catalyst to each 100 grams of resin is substantially the minimum with which the desired results will be secured; and although a percentage of the catalyst greater than 15% may be used, such greater percentage is under most circumstances unnecessary and performs no commensurately improved function in the hydrogenation reaction. While the chromite catalysts are not absolutely free from the reaction of catalyst poisons and inhibitors, they are much less sensitive in these respects than is the Raney nickel catalyst.

In exemplifying the invention by means of the several specific examples hereinafter set forth, there was utilized a uniform procedure in order that the results may be comparative in their illustration. In the procedure of all the following examples there was used a standard hydrogenation bomb; the resin was ground; and the ground resin together with solvent and catalyst was placed in the bomb and the bomb then closed. Hydrogen gas was admitted to the bomb from a suitable supply, as from cylinders of compressed hydrogen at the pressure desired for each particular experiment. The whole assembly was then placed in rotating mechanism of suitable well-known kind and was warmed by gas burners. The bomb is fitted with a thermometer well carrying a thermometer in the usual manner.

During the progress of the hydrogenation the rotating mechanism was stopped at intervals to observe data as to time, pressure and temperature. When the reaction was completed as indicated by cessation in pressure drop within the bomb, the temperature was restored to its initial value and the pressure was again observed. The bomb was vented down to atmospheric pressure and its contents were removed. The catalyst was removed from the reaction solution by filtration and the solvent was removed by steam distillation. These procedures yield a molten residual resin, which is poured into a pan to harden.

Except in those instances in which some element of the reaction mixture was omitted for the purpose of checking the essential features or in which certain observations were considered unnecessary, the foregoing procedure was in every instance followed. Also in operating to obtain recordable data, the usual precautions were taken to ensure that the experiments were as quantitative as possible and each bomb, therefore, was carefully calibrated to volume and the volume of the reaction mixture deducted from it. The figure so secured represented the hydrogen gas volume in the bomb, from which calculations gave the number of cubic centimeters of hydrogen gas employed. This volume was compared with the expected or theoretical value based on the weight of the resin subjected to treatment, and the approximate average molecular weight of the polymers hydrogenated.

To illustrate and interpret a typical hydrogenation conducted in accordance with the invention, the following may be given:

*Example 1*

100 grams of coumarone-indene resin, having a melting point of 150° C. (cube in mercury), together with 100 cc. of petroleum benzine and 5 grams of copper chromite catalyst, was placed in a bomb having a volume of 920 cc. The volume of charge was 200 cc. thus leaving a space having a volume of 720 cc. for the hydrogen gas. The bomb was sealed and hydrogen was run in with heating of the bomb and rotation in the manner above described. The factors of time, pressure in pounds per square inch, and temperature in degrees C. were as follows:

| Time | Temp. | Pressure |
|------|-------|----------|
| 1:25 | 16    | 1,265    |
| 1:35 | 16    | 1,260    |
| 2:15 | 100   | 1,650    |
| 2:30 | 133   | 1,790    |
| 2:45 | 152   | 1,885    |
| 2:55 | 155   | 1,895    |
| 3:15 | 156   | 1,895    |
| 3:25 | 156   | 1,895    |
| 3:35 | 157   | 1,900    |
| 3:55 | 156   | 1,895    |
| 4:05 | 16    | 1,205    |

This run shows a pressure drop of 60 lbs. over the course of the reaction. 60 lbs. divided by 14.7 (1 atmosphere of pressure) equals 4.08. This multiplied by 720 gives 2960 cc. of hydrogen consumed by the 100 grams of resin. 100 grams of the resin is 0.13 mols of resin and requires 2890 cc. of $H_2$ to saturate the single non-nuclear double bond of each resin molecule, and requires 57,800 cc. of $H_2$ to completely saturate the rings, or a total of 60,690 cc. totally to saturate all points in the resin. The selectivity of the resin hydrogenation catalyst is noted by comparing 2960 cc. actually used vs. 2890 cc. required for the one non-nuclear double bond.

The average molecular weight of this particular resin melting close to 150° C. (cube in mercury) is approximately 775. The number of units in the resin molecules averages about 6.67. Two atoms of hydrogen are needed to saturate the two non-nuclear unsaturate carbon atoms of each polymer, and there are 3 double bonds in the benzene ring of each unit. Remembering that the average number of units in the polymer is 6.67 for this particular resin, it will require $3n+1$ mols. of hydrogen wholly to saturate each resin molecule. In this instance $n$ being 6.67, a total of 21 mols, is required wholly to saturate the benzene rings, or aromatic nuclei, of such average resin molecule as well as the non-nuclear terminal of the molecule. The ratio of hydrogen required to eliminate the non-nuclear double bond to that required wholly to saturate the molecule is 1 to 21, which is 4.75% of the maximum potential hydrogen consumption, and 4.75% of 60,690 cc. is about 2890 cc.

It is to be understood that in the ratio represented by 1 to $3n+1$, $n$ is a variable which represents the average number of units in the molecules of any coumarone-indene resin under consideration.

Returning to the specific exemplification of Example 1, it is apparent that the aromatic rings were not hydrogenated by the use of copper chromite catalyst, under the stated conditions. This figures as 102% non-nuclear double bond treatment, which is as near as can be calculated. In order for Raney nickel to have performed with the same effectiveness at the non-nuclear double bond, it also would have fully hydrogenated the rings, the hydrogenation of which is entirely unnecessary to the attainment of a non-yellowing resin.

The resin produced in Example 1 was a clear colorless resin. When exposed to ultra-violet light in a "weathermeter" for 48 hours it showed no trace of "yellowing." After exposure to sunlight for a period of three months, another sample of the resin showed barely perceptible discoloration. Also as illustrating the selectivity and uniformity in the action of the copper chromite catalyst, the following hydrogenation treatments were conducted:

*Example 2*

63 grams of approximately pure indene and 51 grams of high-flash solvent naphtha, were placed in the bomb with 6 grams of copper chromite catalyst. The anticipated consumption of hydrogen fully to hydrogenate the non-nuclear bonds throughout the entire body of the indene was 11,760 cc. Hydrogenation was conducted at an operating temperature close to 100° C. at an initial pressure of 1435 lbs. and at a final pressure of 1220 lbs. The observed hydrogen consumption was 11,700 cc. It will be noted that in the above both the indene and an aromatic solvent were present. Had Raney nickel catalyst been used, the result would have been a total hydrogenation of both components and the volume of hydrogen gas absorbed would have been very much greater than 11,700 cc. With copper chromite catalyst it was to be anticipated that only the indene monomer would be acted upon and that the aromatic solvent would be unattacked, and also that only the non-nuclear double bond of the indene monomer would be hydrogenated. On this basis it was computed that 11,700 cc. proves the selective effect of the catalyst within reasonable experimental error.

In all of the following examples, Examples 3, 4, 5, 6, 7, 8, and 9, there was used exactly the same quality coumarone-indene resin as in Example 1, having a melting point very close to 150° C. (cube in mercury). It was estimated that the weight of hydrogen required to saturate only the terminal double bond in each of the coumarone and indene polymers would be very close to 4.75% of that required to hydrogenate all double bonds in all the units of the polymers. The illustrative results obtained in Examples 3, 4, and 5 were as follows:

*Example 3*

100 grams of coumarone-indene resin having a melting point of about 150° C. (cube in mercury), and 100 cc. of petroleum benzine, were placed in the bomb with 10 grams of copper chromite catalyst, and hydrogen was run in under pressure. The operating temperature of the reaction was close to 200° C. The initial pressure was 630 lbs. and the final pressure was 550 lbs.

The actual consumption of hydrogen was 3,005 cc., which gives a ratio of 4.94% to the total volume of hydrogen which would have been absorbed had all the double bonds of all the molecules been saturated.

*Example 4*

100 grams of the same coumarone-indene resin and 100 cc. of the aliphatic hydrocarbon solvent "Varnolene" were placed in the bomb with 10 grams of copper chromite catalyst and hydrogen was run in under pressure. The operating temperature of the reaction was about 141° C. The initial pressure was 1850 lbs. and the final pressure was 1795 lbs.

The actual consumption of hydrogen was 2948 cc., which gives a ratio of 4.85% to the total volume of hydrogen which would have been absorbed had all the double bonds of all the molecules been saturated.

*Example 5*

100 grams of the same coumarone-indene resin and 100 cc. of petroleum benzine were placed in the bomb with 10 grams of copper chromite catalyst and hydrogen was run in under pressure. The operating temperature of the reaction was close to 157° C. The initial pressure was 1010 lbs. and the final pressure was 950 lbs.

The actual consumption of hydrogen was 2940 cc., which gives a ratio of 4.84% to the total volume of hydrogen which would have been absorbed had all the double bonds of all the molecules been saturated.

In connection with hydrogenation carried out in accordance with my present invention, it was discovered that a number of different solvents can be used satisfactorily, such as methyl-cyclohexane, ethyl-acetate, petroleum benzine, diethyl ether, and dibutyl phthalate, and that in general solvents can be satisfactorily employed which fall within any one of the following five classifications:

1. Cycloparaffins
2. Aliphatic esters
3. Straight chain paraffins
4. Ethers
5. Aromatic acid esters The following five experiments indicate results secured by the use of CuCrO on coumarone-indene resin with some of those solvents, from which it will be understood that the solvent does not interfere with hydrogenation nor does it particularly influence it:

*Example 6*

100 grams of the same coumarone-indene resin and 100 cc. of methyl-cyclohexane were placed in the bomb with 10 grams of copper chromite catalyst and hydrogen was run in under pressure. The operating temperature of the reaction was close to 162° C. The initial pressure was 1015 lbs. and the final pressure was 960 lbs.

The actual consumption of hydrogen was 2950 cc., which fives a ratio of 4.86% to the total volume of hydrogen which would have been absorbed had all the double bonds of all the molecules been saturated.

*Example 7*

100 grams of the same coumarone-indene resin and 100 cc. of petroleum benzine were placed in the bomb with 10 grams of copper chromite catalyst and hydrogen was run in under pressure. The operating temperature of the reaction was close to 156° C. The initial pressure was 1025 lbs. and the final pressure was 950 lbs.

The actual consumption of hydrogen was 2940 cc., which gives a ratio of 4.84% to the total volume of hydrogen which would have been absorbed had all the double bonds of all the molecules been saturated.

*Example 8*

100 grams of the same coumarone-indene resin and 100 cc. of diethyl ether were placed in the bomb with 10 grams of copper chromite catalyst and hydrogen was run in under pressure. The initial pressure was 1000 lbs. and the final pressure was 925 lbs.

The actual consumption of hydrogen was 3680 cc., which gives a ratio of 5.9% to the total volume of hydrogen which would have been absorbed had all the double bonds of all the molecules been saturated.

*Example 9*

100 grams of the same coumarone-indene resin and 100 cc. of dibutyl phthalate were placed in the bomb with 10 grams of copper chromite catalyst and hydrogen was run in under pressure. The operating temperature of the reaction was close to 156° C. The initial pressure was 1000 lbs. and the final pressure was 935 lbs.

The actual consumption of hydrogen was 3180 cc., which gives a ratio of 5.2% to the total volume of hydrogen which would have been absorbed had all the double bonds of all the molecules been saturated.

*Example 10*

In order to check the molecular effect of the hydrogenation method, there has been taken a liquid oily coumarone-indene resin melting below 0° C. and composed chiefly of the dimers of coumarone and indene. 100 grams of this low-melting coumarone-indene resin was placed in the bomb with 10 grams of copper chromate catalyst, without solvent, and hydrogen was run in under pressure. The operating temperature was close to 225° C. The initial pressure was 1100 lbs. and the final pressure was 910 lbs.

The actual consumption of hydrogen was 11,500 cc. With the liquid resin treated the ratio of hydrogen required to saturate the lone terminal double bond of each molecule is approximately 14% of that required fully to hydrogenate the molecule and the consumption of 11,500 cc. of hydrogen represents 118% of that required to eliminate the non-nuclear double bonds, or 14.8% of the total hydrogen consumption required wholly to saturate the molecules of the resin.

In the case of this liquid coumarone-indene resin, consisting approximately 100% of coumarone-indene dimers, the average number of units in the molecules is two, so that the formula 1:3 + 1 gives a ratio of 1:7, or approximately 14%, in comparing saturation of the terminal non-nuclear structure with saturation of the entire molecular structure.

It is to be understood of all the foregoing examples that the treated resin was substantially colorless. When exposed to ultra-violet light in a "weathermeter" for 48 hours it showed no trace of "yellowing." After exposure to sunlight for a period of three months other samples of the resin were just perceptibly "yellowed."

It is an important advantage of the chromite hydrogenation catalysts that by their use non-yellowing coumarone-indene resins can be produced by hydrogenation at temperatures far below those commonly employed in the catalytic hydrogenation of resins. Whereas it has been usual in the past to effect such reactions at temperatures of about 200° C. and higher, the chromite catalysts give good results at temperatures within the approximate range of 100° C. to 175° C. and even at temperatures as low as 70° C. or 75° C. The following example gives the course of a hydrogenation treatment purposely conducted at low temperature to determine what temperature, if any, represents the critical minimum in producing the non-yellowing resin:

Example 11

100 grams of coumarone-indene resin having a melting point of 150° C. (cube in mercury) was placed in the bomb with 100 cc. of the aliphatic hydrocarbon solvent "Varnolene" and 10 grams of copper chromite catalyst. The progress of the hydrogenation reaction was as follows:

| Time | Temp. | Pressure |
|---|---|---|
|  | ° C. |  |
| 9:10 | 19 | 1,835 |
| 9:20 | 19 | 1,825 |
| 9:25 | 19 | 1,820 |
| 9:30 | 19 | 1,810 |
| 9:35 | 19 | 1,815 |
| 9:45 | 19 | 1,815 |

Some slight absorption may be occurring in addition to loss of pressure due to solution of $H_2$ in the solvent used.

| Time | Temp. | Pressure |
|---|---|---|
|  | ° C. |  |
| 10:00 | 33 | 1,900 |
| 10:15 | 41 | 1,950 |
| 10:20 | 42 | 1,950 |

No sustained absorption indicated near 42° C.

| Time | Temp. | Pressure |
|---|---|---|
|  | ° C. |  |
| 10:30 | 50 | 2,000 |
| 10:40 | 57 | 2,060 |
| 10:50 | 64 | 2,090 |
| 11:05 | 69 | 2,120 |
| 11:10 | 75 | 2,160 |
| 11:45 | 76 | 2,170 |

End of absorption period.

When cooled to original temperature, a pressure loss of 55 pounds had occurred equal to a consumption of hydrogen amounting to 2950 cc. or a percentage figure of 4.86%. Analysis shows that the reaction was complete or substantially complete at about 70–75° C. Even at 19° C. there is evidence that the reaction is initiated and has run to about one-third (⅓) of completion.

The coumarone-indene resin subjected to this hydrogenation treatment was tested for its retention of the yellowing tendency and was found to have almost as good color stability as those resins which had been treated at higher temperatures.

As to the factors of temperature and pressure, it is apparent from the foregoing discussion and exemplifications that relatively low temperature and relatively low pressure is adequate to effect hydrogenation of coumarone-indene resin with copper chromite catalyst in a molecular ratio of approximately 1:1. Somewhat higher temperatures may be used, desirably by hydrogenating initially at a temperature below 200° C. and raising the temperature of the reaction mixture at a point where the absorption of hydrogen tends to lag. By so doing the time required for a thorough saturation at the non-nuclear double bonds in the resin molecules may be shortened. In no case, however, has it been found desirable to utilize a maximum temperature in excess of 225° C. when using as a catalyst copper chromite, or one of its substantial equivalents, iron chromite and nickel chromite. In no case has it been found desirable to conduct the hydrogenation under a pressure substantially in excess of 2100 lbs. per square inch.

Remembering always that the purpose of this invention is to saturate only the one specific double bond of the resin polymers in as high an order of completeness as may be possible, it will be seen that this has been effected in simple manner and by moderate operating conditions. Thus with the relatively high melting coumarone-indene resin of Examples 1 to 9 inclusive, the average structure of the resin polymers as to monomeric units included in them is such that a quantity of hydrogen fairly close to 5% of that required for theoretically complete saturation of all the units of all the molecules is required for this purpose. The absorption of a substantially greater proportion of hydrogen would indicate absorption into the double bonds comprised in the benzene rings of the several monomeric units of the molecules, and values below about 3% of the theoretically complete saturation would indicate that a large proportion of the resin molecules remain unsaturated as to the one non-nuclear double bond of each. The results of all the examples are to be considered as satisfactory in effecting approximately complete saturation at the non-nuclear double bonds of the polymers without substantially saturating at the double bonds in the aromatic nuclei or benzene rings of the polymers.

All the foregoing examples have exemplified the use of copper chromite, which is the preferred catalyst. Instead of copper chromite, however, one may, with satisfaction, use iron chromite or nickel chromite, or mixtures of all or any two of the three metal chromites forming the group of copper chromite, iron chromite, and nickel chromite. The following examples exemplify the use of the two last named members of the group:

Example 12

100 grams of coumarone-indene resin having a melting point of 150° C. (cube in mercury) was placed in the bomb with 100 cc. of the aliphatic hydrocarbon solvent "Varnolene" and 10 grams of iron chromite, and hydrogen was run in under pressure. The operating temperature of the reaction was close to 122° C. The initial pressure was 1830 lbs. and the final pressure was 1780 lbs.

The actual consumption of hydrogen was 2920 cc., which gives a ratio of 4.81% to the total volume of hydrogen which would have been absorbed had all the double bonds of all the molecules been saturated.

The resin treated in this example was substantially colorless. When exposed to ultra-violet light in a "weathermeter" for 48 hours it showed no trace of color. After exposure to sunlight for a period of three months, other samples of the resin were slightly yellow.

Example 13

100 grams of coumarone-indene resin having a melting point of 150° C. was placed in the bomb with 100 cc. of the aliphatic hydrocarbon solvent "Varnolene" and 10 grams of nickel chromite, and hydrogen was run in under pressure. The operating temperature of the reaction was close to 100° C. The initial pressure was 1390 lbs. and the final pressure was 1345 lbs.

The actual consumption of hydrogen was 2370 cc., which gives a ratio of 4.0% to the total volume of hydrogen which would have been absorbed had all the double bonds of all the molecules been saturated.

The resin treated in the foregoing example was substantially colorless. When exposed to ultraviolet light in a "weathermeter" for 48 hours, and after exposure to sunlight for a period of three months, it showed color development to but slightly greater depth than occurred in the products of hydrogenation induced by copper chromite. The color development is so slight that the resin is definitely to be considered nonyellowing coumarone-indene resin.

The results of the foregoing examples closely approximate perfection, and it is to be considered, therefore, that without more, metal chromites of the specified class are wholly satisfactory catalysts. In certain circumstances, however, as when it is desired to accelerate the hydrogen reaction, or a reused catalyst would show signs of exhaustion, it is desirable to associate with the chromite catalyst a metal oxide or metal chromite capable of acting as a catalyst-promotor or catalyzer of the hydrogenation catalyst itself. For this purpose, there thas been used the following metal chromites and other oxides: manganese chromite, manganese oxide, barium chromite, barium oxide, zinc oxide, cobalt chromite, cobalt oxide, nickel chromite, nickel oxide, copper-nickel oxide, nickel-chromium oxide, molybdenum oxide, copper oxide. Of these only black copper oxide is by itself an effective hydrogenation catalyst. To exemplify the use of such catalyst promotor there may be given the following illustrative examples:

Example 14

100 grams of coumarone-indene resin having a melting point of 150° C. (cube in mercury) and 100 cc. of petroleum benzine were placed in the bomb with 10 grams of copper chromite and 1 gram of manganese oxide and hydrogen was run in under pressure. The operating temperature of the reaction was close to 156° C. The initial pressure was 1025 lbs. and the final pressure was 945 lbs.

The actual consumption of hydrogen was 3920 cc., which gives a ratio of 6.45% to the total volume of hydrogen which would have been absorbed had all the double bonds of all the molecules been saturated.

Example 15

100 grams of coumarone-indene resin having a melting point of 150° C. (cube in mercury) and 100 cc. of petroleum benzine were placed in the bomb, together with 10 grams of copper chromite and 1 gram of zinc oxide. The operating temperature of the reaction was close to 159° C. the initial pressure was 1010 lbs. and the final pressure was 940 lbs.

The actual consumption of hydrogen was 3480 cc., which gives a ratio of 5.71% to the total volume of hydrogen which would have been absorbed had all the double bonds of all the molecules been saturated.

In both these examples, Nos. 14 and 15, the result was to give a slight over-treatment, assuring the complete saturation of all of the non-nuclear double bonds of the resin. The coumarone-indene resins produced in the examples were colorless resins which showed no preceptible yellowing after exposure to ultra-violet light in the "weathermeter" for 48 hours, or after exposure to sunlight for three months.

It has been noted above that mixtures of the specified chromite catalysts suitably may be used. In fact, mixtures of any two or more of copper chromite, iron chromite, and nickel chromite give particularly desirable results.

It is to be understood that in the foregoing where melting point is given without qualification, it is to be taken as determined by the cube in mercury method of melting point determination. As explained, the term "coumarone-indene resins" is to be taken as inclusive of resins composed of the polymers of either of those two substances, as well as resins composed of a mixture of polymers of the two. Where pressure is given in pounds without other explanation, it is to be taken as meaning pounds per square inch. Where parts or proportions are given without express or implied qualification as to comparison of volumes, it is to be taken that parts by weight is intended. Where a monomeric substance, or resin, is named as "indene" in description or illustration above, "coumarone" is to be understood as alternatively applicable, the two being interchangeable in the terms of the specification.

What is claimed is:

1. A method of selectively hydrogenating coumarone-indene resin which comprises the steps of bringing such coumarone-indene resin into contact with hydrogen in the presence of copper chromite at a temperature ranging from about 75° C. to 225° C. and under a pressure not exceeding 2100 pounds per square inch, thereby to chemically saturate only the non-aromatic double bond which characterizes the indene and coumarone resin structure.

2. A method of selectively hydrogenating coumarone-indene resin which comprises the steps of bringing such coumarone-indene resin into contact with hydrogen in the presence of copper chromite at a temperature ranging from about 75° C. to 225° C. and under a pressure not exceeding 2100 pounds per square inch, thereby to chemically saturate only the non-aromatic double bond which characterizes the indene and coumarone resin structure, the conditions being controlled to limit the combination of resin and hydrogen to a molecular ratio of 1:1.

3. A method of selectively hydrogenating coumarone-indene resin which comprises the steps of bringing such coumarone-indene resin into contact with hydrogen in the presence of copper chromite under such temperature and pressure conditions as chemically to saturate only the non-aromatic double bond which characterizes the indene and coumarone resin structure, the selective hydrogenation being carried out at a temperature ranging from about 75° C. to 225° C. and at an initial pressure ranging from about 630 pounds per square inch to 1850 pounds per square inch.

4. A method of selectively hydrogenating coumarone-indene resin which comprises the steps of bringing such coumarone-indene resin into contact with hydrogen in the presence of copper chromite under such temperature and pressure conditions as chemically to saturate only the non-aromatic double bond which characterizes the indene and coumarone resin structure, the selective hydrogenation carried out at a temperature ranging from about 75° C. to 225° C. being effected step-wise by controlling the temperature in such manner that it does not exceed 200° C. in the first stage thereof with the balance of the selective hydrogenation being carried out at the temperature of approximately 225° C. and at a pressure not exceeding 2100 pounds per square inch.

5. A method of selectively hydrogenating coumarone-indene resin which comprises the steps of bringing such coumarone-indene resin into contact with hydrogen in the presence of copper chromite at a temperature ranging from about 75° C. to 225° C. and at an initial pressure ranging from about 630 pounds per square inch chemically to saturate only the non-aromatic double bond which characterizes the indene and coumarone resin structure, the said coumarone-indene resin being in dissolved form and the catalyst constituting from about 5% to 15% by weight of the said resin.

6. The herein-described method of selectively hydrogenating coumarone-indene resin by bringing such coumarone-indene resin into contact with hydrogen in the presence of a metal chromite catalyst selected from the group consisting of copper chromite, iron chromite, and nickel chromite, at a temperature ranging from about 75° C. to 225° C. and under a pressure not exceeding 2100 pounds per square inch, thereby to chemically saturate only the non-aromatic double bond which characterizes the indene and coumarone resin structure.

7. A method of selectively hydrogenating coumarone-indene resin which comprises the steps of bringing such coumarone-indene resin into contact with hydrogen in the presence of metal chromite catalyst selected from the group consisting of copper chromite, iron chromite, and nickel chromite, at a temperature ranging from about 75° C. to 225° C. and under a pressure not exceeding 2100 pounds per square inch, thereby to chemically saturate only the non-aromatic double bond which characterizes the indene and coumarone resin structure, the conditions being controlled to limit the combination of resin and hydrogen to a molecular ratio of 1:1.

8. A method of selectively hydrogenating coumarone-indene resin which comprises the steps of bringing such coumarone-indene resin into contact with hydrogen in the presence of metal chromite catalyst selected from the group consisting of copper chromite, iron chromite, and nickel chromite, under such temperature and pressure conditions as chemically to saturate only the non-aromatic double bond which characterizes the indene and coumarone resin structure, the selective hydrogenation being carried out at a temperature ranging from about 75° C. to 225° C. and at an initial pressure ranging from about 630 pounds per square inch to 1850 pounds per square inch.

9. A method of selectively hydrogenating coumarone-indene resin which comprises the steps of bringing such coumarone-indene resin into contact with hydrogen in the presence of metal chromite catalyst selected from the group consisting of copper chromite, iron chromite, and nickel chromite, under such temperature and pressure conditions as chemically to saturate only the non-aromatic double bond which characterizes the indene and coumarone resin structure, the selective hydrogenation carried out at a temperature ranging from about 75° C. to 225° C., being effected step-wise by controlling the temperature in such manner that it does not exceed 200° C. in the first stage thereof with the balance of the selective hydrogenation being carried out at the temperature of approximately 225° C. and at a pressure not exceeding 2100 pounds per square inch.

10. A method of selectively hydrogenating coumarone-indene resin which comprises the steps of bringing such coumarone-indene resin into contact with hydrogen in the presence of metal chromite catalyst selected from the group consisting of copper chromite, iron chromite, and nickel chromite, at a temperature ranging from about 75° C. to 225° C. and at an initial pressure ranging from about 630 pounds per square inch chemically to saturate only the non-aromatic double bond which characterizes the indene and couramone resin structure, the said coumarone-indene resin being in dissolved form and the catalyst constituting from about 5% to 15% by weight of the said resin.

MARIE O. CARMODY,
*Administratrix of the Estate of William H. Carmody, Deceased.*

REFERENCES CITED

The following references are of record in the file of this patent:

UNITED STATES PATENTS

| Number | Name | Date |
|---|---|---|
| 2,128,984 | Carmody | Sept. 6, 1938 |
| 2,128,985 | Carmody | Sept. 6, 1938 |
| 2,139,722 | Carmody | Dec. 13, 1938 |
| 2,266,675 | Carmody | Dec. 16, 1941 |

FOREIGN PATENTS

| Number | Country | Date |
|---|---|---|
| 504,215 | German | Mar. 30, 1926 |

OTHER REFERENCES

Adkins et al., J. Amer. Chem. Soc., vol. 53, pages 1091 to 1095 (1931).